(12) United States Patent
Jiang et al.

(10) Patent No.: US 11,803,988 B2
(45) Date of Patent: Oct. 31, 2023

(54) METHOD AND APPARATUS FOR ADAPTIVE IMAGE COMPRESSION WITH FLEXIBLE HYPERPRIOR MODEL BY META LEARNING

(71) Applicant: TENCENT AMERICA LLC, Palo Alto, CA (US)

(72) Inventors: Wei Jiang, Sunnyvale, CA (US); Wei Wang, Palo Alto, CA (US); Shan Liu, San Jose, CA (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 323 days.

(21) Appl. No.: 17/362,039

(22) Filed: Jun. 29, 2021

(65) Prior Publication Data
US 2022/0292726 A1 Sep. 15, 2022

Related U.S. Application Data

(60) Provisional application No. 63/161,216, filed on Mar. 15, 2021.

(51) Int. Cl.
*G06T 9/00* (2006.01)
*G06N 3/08* (2023.01)
*G06N 3/045* (2023.01)

(52) U.S. Cl.
CPC ............ *G06T 9/002* (2013.01); *G06N 3/045* (2023.01); *G06N 3/08* (2013.01)

(58) Field of Classification Search
None
See application file for complete search history.

(56) References Cited

U.S. PATENT DOCUMENTS

| 2005/0066075 | A1* | 3/2005 | Kecman | H04N 19/593 |
| | | | | 375/E7.04 |
| 2020/0027247 | A1* | 1/2020 | Minnen | G06T 9/002 |
| 2020/0051260 | A1* | 2/2020 | Shen | G06T 5/002 |
| 2020/0082270 | A1* | 3/2020 | Gu | G06N 5/045 |

(Continued)

OTHER PUBLICATIONS

Content Adaptive Optimization for Neural Image Compression. Campos et al. (Year: 2019).*

(Continued)

*Primary Examiner* — Delomia L Gilliard
(74) *Attorney, Agent, or Firm* — Sughrue Mion, PLLC

(57) ABSTRACT

A method of adaptive neural image compression with a hyperprior model by meta-learning is performed by at least one processor and includes generating a statistic feature, based on an input image and a hyperparameter, and generating a first shared feature and an estimated adaptive encoding parameter, encoding the input image to obtain a signal encoded image, based on the generated first shared feature and the generated estimated adaptive encoding parameter, generating a second shared feature and an estimated adaptive hyper encoding parameter, generating a hyper feature, based on the signal encoded image, the generated second shared feature, and the generated estimated adaptive hyper encoding parameter, and compressing the obtained signal encoded image, the generated statistic feature, and the generated hyper feature.

19 Claims, 12 Drawing Sheets

(56) References Cited

U.S. PATENT DOCUMENTS

2020/0160565 A1* 5/2020 Ma .................. H04N 19/60

OTHER PUBLICATIONS

Deep Learning with Adaptive Hyper-parameters for Low-Dose CT Image Reconstruction. Ding et al. (Year: 2021).*
Bayesian Model-Agnostic Meta-Learning. Yoon et al., (Year: 2018).*
International Search Report dated Nov. 8, 2021 in Application No. PCT/US2021/044896.
Written Opinion of the International Searching Authority dated Nov. 8, 2021 in Application No. PCT/US2021/044896.
Joaquim Campos et al., "Content Adaptive Optimization for Neural Image Compression", Jun. 5, 2019, arXiv:1906.01223v2, 5 pages.
Jaesik Yoon et al., "Bayesian Model-Agnostic Meta-Learning", Proceedings of the 32nd International Conference on Neural Information Processing Systems, Dec. 2018, pp. 1-11 (11 pages).
Qiaoqia Ding et al., "Deep Learning with Adaptive Hyper-parameters for Low-Dose CT Image Reconstruction", Feb. 17, 2021, arXiv:2008.04656v2, pp. 1-17, (17 pages).
Johannes Balle et al., "Variational Image Compression with a Scale Hyperprior", May 1, 2018, arXiv:1802.01436v2, pp. 1-23 (23 pages).
Zhengxue Cheng et al., "Learned Lossless Image Compression with a Hyperprior and Discretized Gaussian Mixture Likelihoods", Feb. 5, 2020, arXiv:2002.01657v1, 6 pages.

* cited by examiner

METHOD AND APPARATUS FOR ADAPTIVE IMAGE COMPRESSION WITH FLEXIBLE HYPERPRIOR MODEL BY META LEARNING

CROSS-REFERENCE TO RELATED APPLICATION

This application is based on and claims priority to U.S. Provisional Patent Application No. 63/161,216, filed on Mar. 15, 2021, the disclosure of which is incorporated by reference herein in its entirety.

BACKGROUND

Standard groups and companies have been actively searching for potential needs for standardization of future video coding technology. These standard groups and companies have focused on artificial intelligence (AI)-based end-to-end neural image compression (NIC) using deep neural networks (DNNs). The success of this approach has brought more and more industrial interest in advanced neural image and video compression methodologies.

Typically, a pre-trained NIC model instance is computed by using a set of training data, assuming that the training data covers the entire data distribution of all natural images and an universal model instance with pre-trained fixed model parameters can be obtained to work on all natural images. This assumption is not true in practice. Real natural images have various data distributions, and a pre-trained NIC model can only work well on a subset of images normally. It is highly desired that an NIC model can adaptively select its model parameters to accommodate different input images.

SUMMARY

According to embodiments, a method of adaptive neural image compression with a hyperprior model by meta-learning is performed by at least one processor and includes generating a statistic feature, based on an input image and a hyperparameter, and generating a first shared feature and an estimated adaptive encoding parameter, encoding the input image to obtain a signal encoded image, based on the generated first shared feature and the generated estimated adaptive encoding parameter, generating a second shared feature and an estimated adaptive hyper encoding parameter, generating a hyper feature, based on the obtained signal encoded image, the generated second shared feature, and the generated estimated adaptive hyper encoding parameter, and compressing the obtained signal encoded image, the generated statistic feature, and the generated hyper feature. The method further includes decoding the compressed signal encoded image to obtain a recovered image, the compressed statistic feature to obtain a recovered statistic feature, and the compressed hyper feature to obtain a recovered hyper feature, generating a third shared feature and an estimated adaptive hyper decoding parameter, generating a hyper prior feature, based on the recovered statistic feature, the generated third shared feature, and the estimated adaptive hyper decoding parameter; and generating a reconstructed image, based on the generated hyper prior feature and the obtained recovered image.

According to embodiments, an apparatus for adaptive neural image compression with a hyperprior model by meta-learning includes at least one memory configured to store program code, and at least one processor configured to read the program code and operate as instructed by the program code, the program code including statistic feature generating code configured to cause the at least one processor to generate a statistic feature, based on an input image and a hyperparameter, a first shared feature generating code configured to cause the at least one processor to generate a first shared feature, an adaptive encoding code configured to cause the at least one processor to generate an estimated adaptive encoding parameter, encoding code configured to cause the at least one processor to encode the input image to obtain a signal encoded image, based on the first shared feature and the estimated adaptive encoding parameter, a second shared feature generating code configured to cause the at least one processor to generate a second shared feature, adaptive hyper encoding code configured to cause the at least one processor to generate an estimated adaptive hyper encoding parameter, a hyper feature generating code configured to cause the at least one processor to generate a hyper feature, based on the obtained signal encoded image, the second shared feature, and the estimated adaptive hyper encoding parameter, and compression code configured to cause the at least one processor to compress the obtained signal encoded image, the generated statistic feature, and the generated hyper feature. The program code further includes decoding code configured to cause the at least one processor to decode the compressed image to obtain a recovered image, the compressed statistic feature to obtain a recovered statistic feature, and the compressed hyper feature to obtain a recovered hyper feature, a third shared feature generating code configured to cause the at least one processor to generate a third shared feature, adaptive hyper decoding code configured to cause the at least one processor to generate an estimated adaptive hyper decoding parameter, a hyper prior feature generating code configured to cause the at least one processor to generate a hyper prior feature, based on the recovered statistic feature, the third shared feature, and the estimated adaptive hyper decoding parameter, and reconstruction code configured to cause the at least one processor to generate a reconstructed image, based on the generated hyper prior feature and the recovered image.

According to embodiments, a non-transitory computer-readable medium storing instructions that, when executed by at least one processor generate a statistic feature, based on an input image and a hyperparameter, generate a first shared feature, generate an estimated adaptive encoding parameter, encode the input image to obtain a signal encoded image, based on the first shared feature and the estimated adaptive encoding parameter, generate a second shared feature, generate an estimated adaptive hyper encoding parameter, generate a hyper feature, based on the obtained signal encoded image, the second shared feature, and the estimated adaptive hyper encoding parameter, compress the obtained signal encoded image, the generated statistic feature, and the generated hyper feature, decode the compressed signal encoded image to obtain a recovered image, the compressed statistic feature to obtain a recovered statistic feature, and the compressed hyper feature to obtain a recovered hyper feature, generate a third shared feature, generate an estimated adaptive hyper decoding parameter, generate a hyper prior feature, based on the recovered statistic feature, the generated third shared feature, and the generated estimated adaptive hyper decoding parameter, and generate a reconstructed image, based on the generated hyper prior feature and the recovered image.

DETAILED DESCRIPTION

This disclosure describes a method and an apparatus for an adaptive neural image compression (Ada-NIC) framework that automatically and adaptively selects the optimal model parameters for compressing an image based on the characteristics of the individual input image. The meta learning mechanism is used to automatically compute the adaptive weight parameters of the underlying NIC model based on the current input image.

Figure 1:
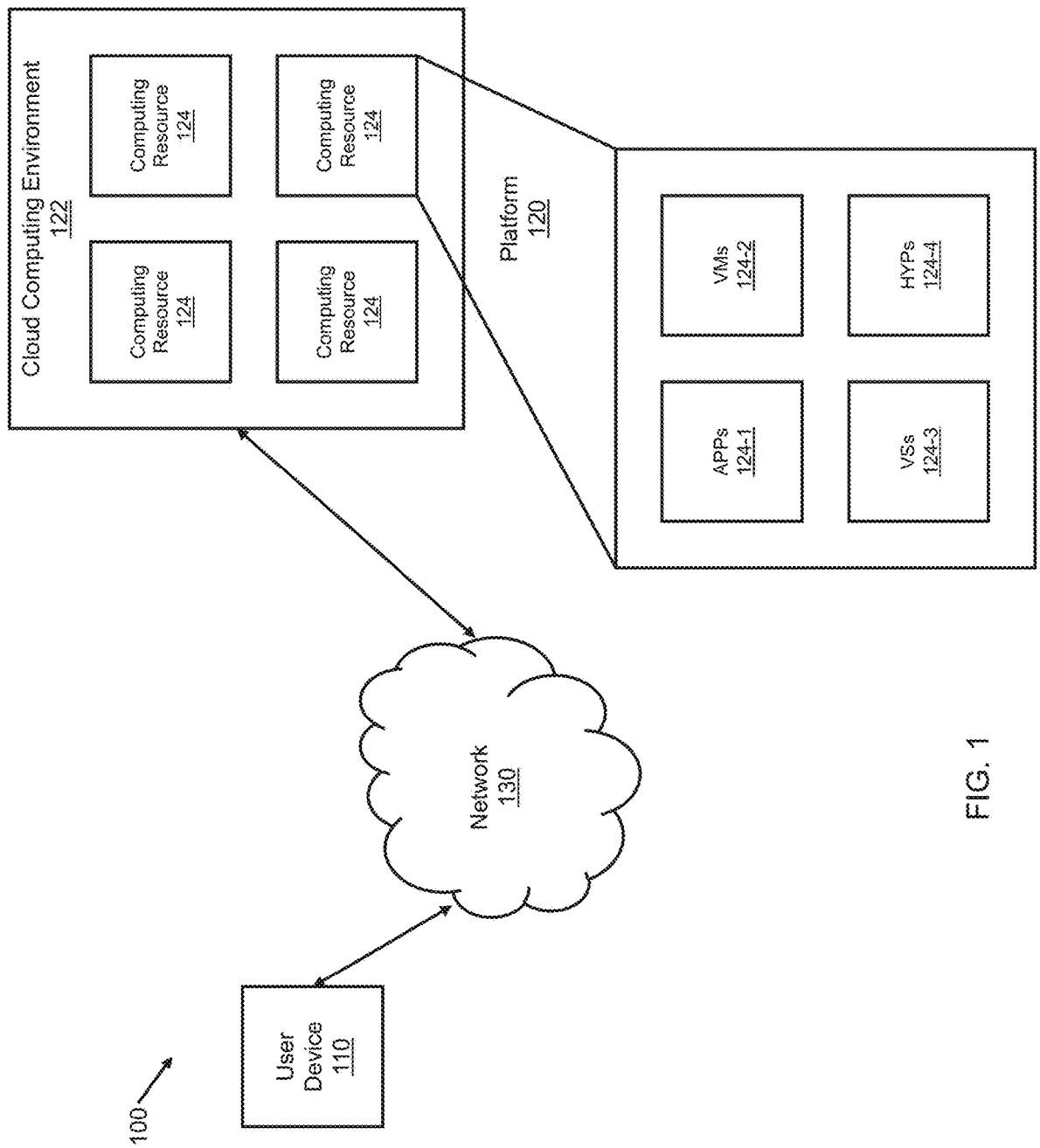
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
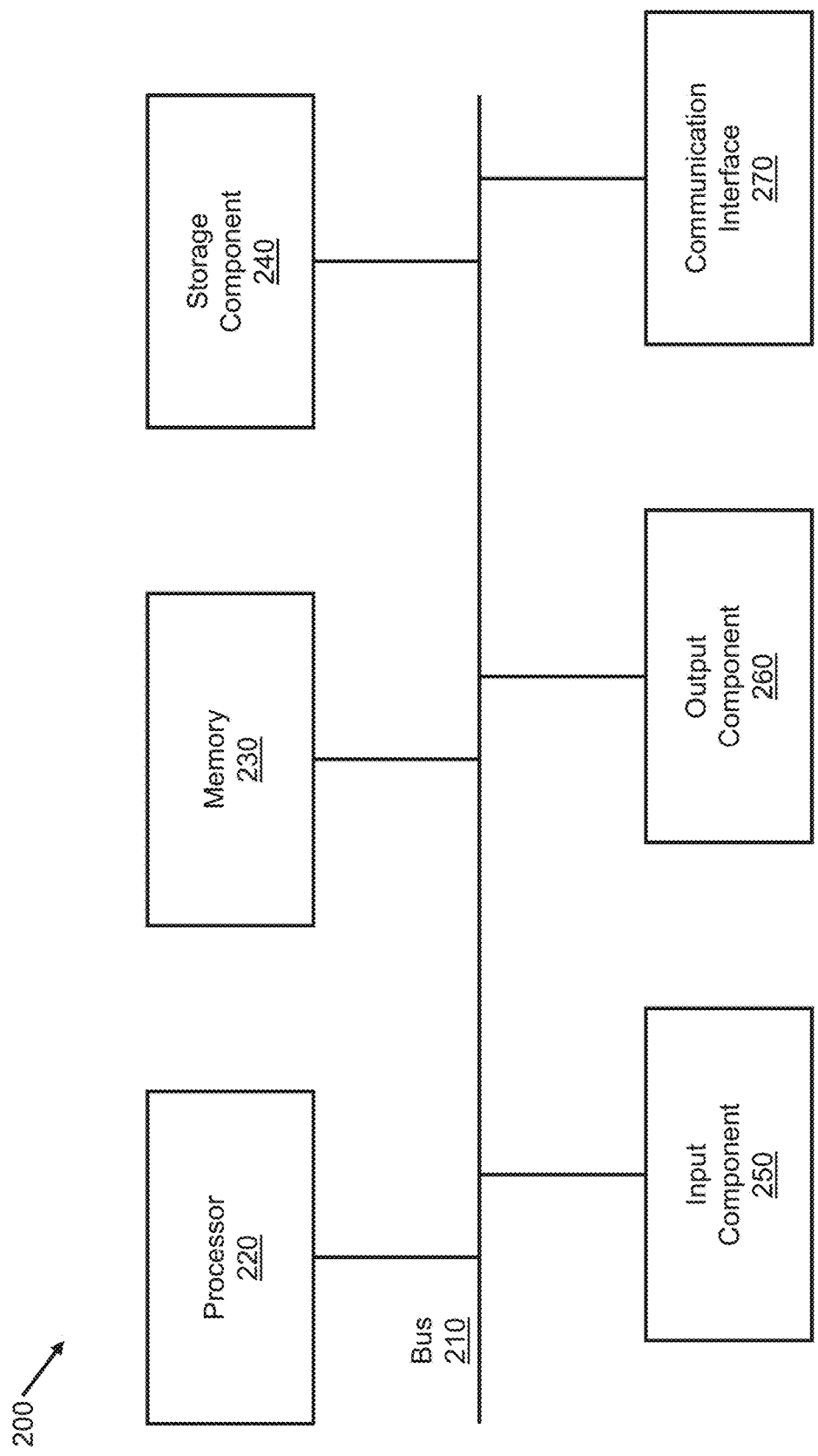
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A method and an apparatus for Adaptive Neural Image Compression (Ada-NIC) with adaptive model parameter selection by meta-learning will now be described in detail.

This disclosure proposes an Ada-NIC framework that supports adaptive model parameter selection. The meta-learning mechanism is used to automatically compute the adaptive weight parameters of the underlying NIC model based on the current input image, so that the Ada-NIC model can improve compression of the image.

Figure 3:
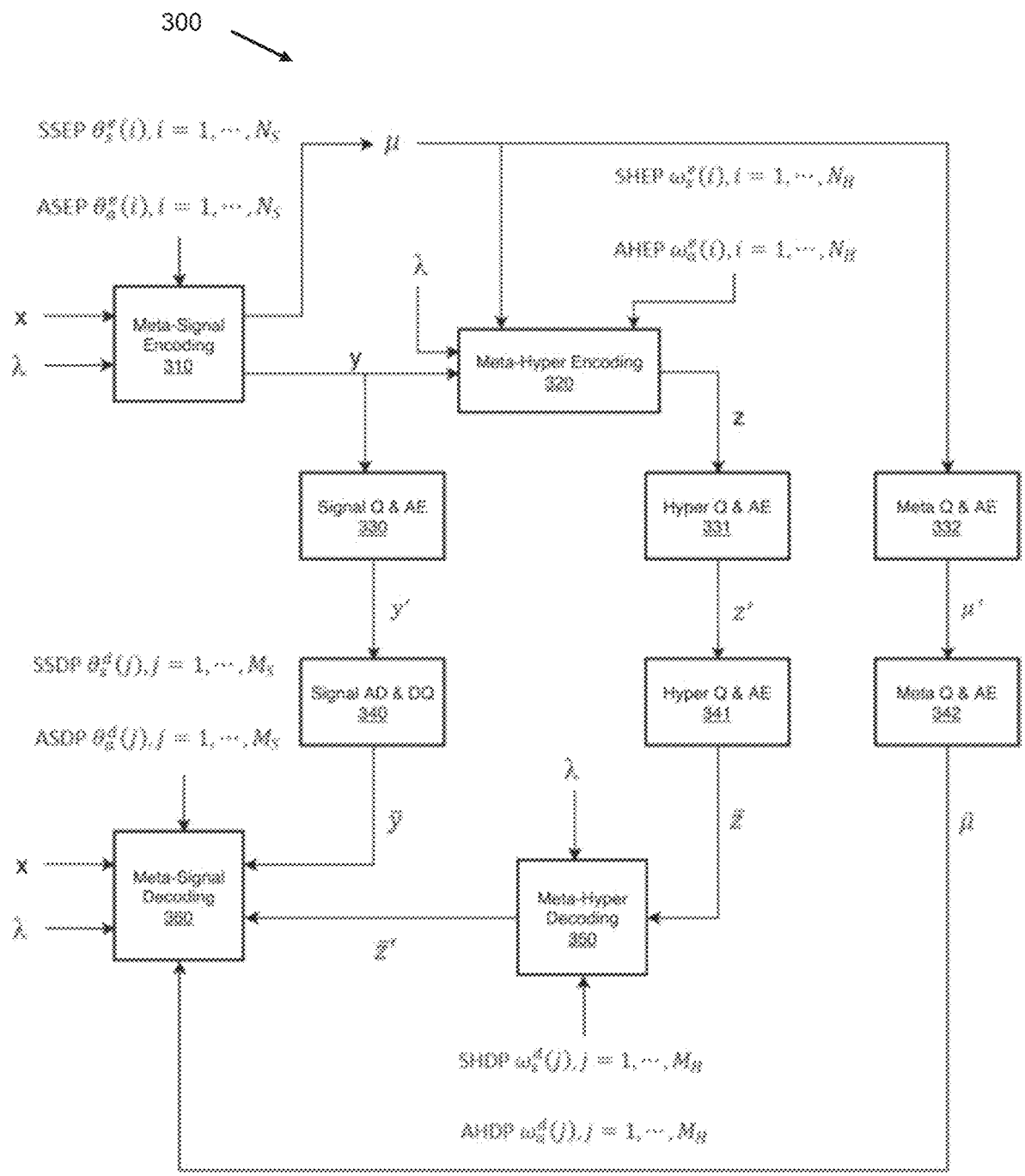
FIG. 3 is a block diagram of a test apparatus for multi-rate neural image compression by micro-structured nested masks and weight unification, during a test stage, according to embodiments.

FIG. 3 is a block diagram of a test apparatus 300 for an Ada-NIC with a flexible hyperprior model by meta-learning, during a test stage, according to the embodiments.

As shown in FIG. 3, the test apparatus 300 includes a Meta-Signal Encoding module 310, a Meta-Hyper Encoding module 320, a Signal Q & AE module 330, a Hyper Q & AE module 331, a Meta Q & AE module 332, a Signal AD & DQ module 340, a Hyper AD & DQ module 341, a Meta AD & DQ module 342, a Meta-Hyper Decoding module 350, and a Meta-Signal Decoding module 360.

Given an input image x of size (h, w, c), where h, w, c are the height, width, and number of channels, respectively, the target of the test stage of an NIC workflow can be described as follows. A compressed representation that is compact for storage and transmission is computed. Then, based on this compressed representation, an output image $\bar{y}$ is reconstructed, and the reconstructed output image $\bar{x}$ may be similar to the original input x. A distortion loss $D(x, \bar{x})$ is used to measure the reconstruction error, such as PSNR or SSIM. A rate loss R is computed to measure the bit consumption of the compressed representation $\bar{y}$. A hyperparameter X is used to form a joint Rate-Distortion (R-D) loss:

$$L = \lambda D(x,\bar{x}) + R \qquad (1)$$

Training with a large hyperparameter $\lambda$ results in compression models with smaller distortion but more bit consumption, and vice versa.

Figure 4A:
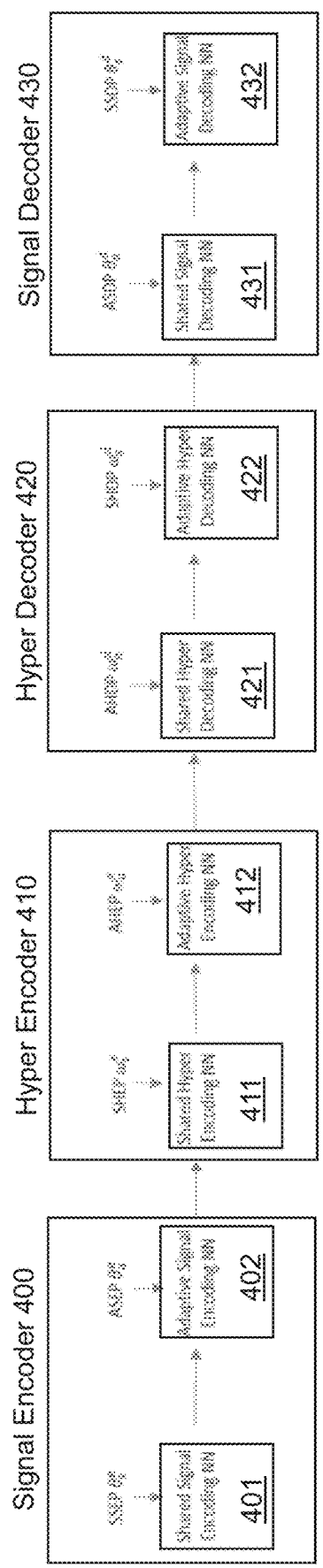
FIG. 4(a) is a flow diagram of the model parameters of the underlying NIC encoder and decoder modules separated into individual NN.

FIG. 4(a) is a flow diagram of the model parameters 401, 402, 411, 412, 421, 422, 431, 432 of the underlying NIC encoder modules 400, 410 and decoder modules 420, 430 separated into individual NN.

The model parameters of the underlying NIC encoder and decoder are separated into 8 parts, $\theta_s^e$, $\theta_a^e$, $\theta_s^d$, $\theta_a^d$, $\omega_s^e$, $\omega_a^e$, $\omega_s^d$, $\omega_a^d$, denoting shared signal encoding parameters (SSEP) 401, adaptive signal encoding parameters (ASEP) 402, shared signal decoding parameters (SSDP) 432, and adaptive signal decoding parameters (ASDP) 431, shared hyper encoding parameters (SHEP) 411, adaptive hyper encoding parameters (AHEP) 412, shared hyper decoding parameters (SHDP) 422, and adaptive hyper decoding parameters (AHDP) 421, respectively. In the embodiments of the NIC network architecture, the SSEP 401, ASEP 402, SHEP 411, AHEP 412, AHDP 421, SHDP 422, ASDP 431, and SSDP 432 are separate individual NN modules, each comprising one or multiple NN layers. These individual modules are connected to each other sequentially for network forward computation. FIG. 4(a) shows a preferred sequential order of connecting these individual NN modules. Other orders may also be used.

Figure 4B:
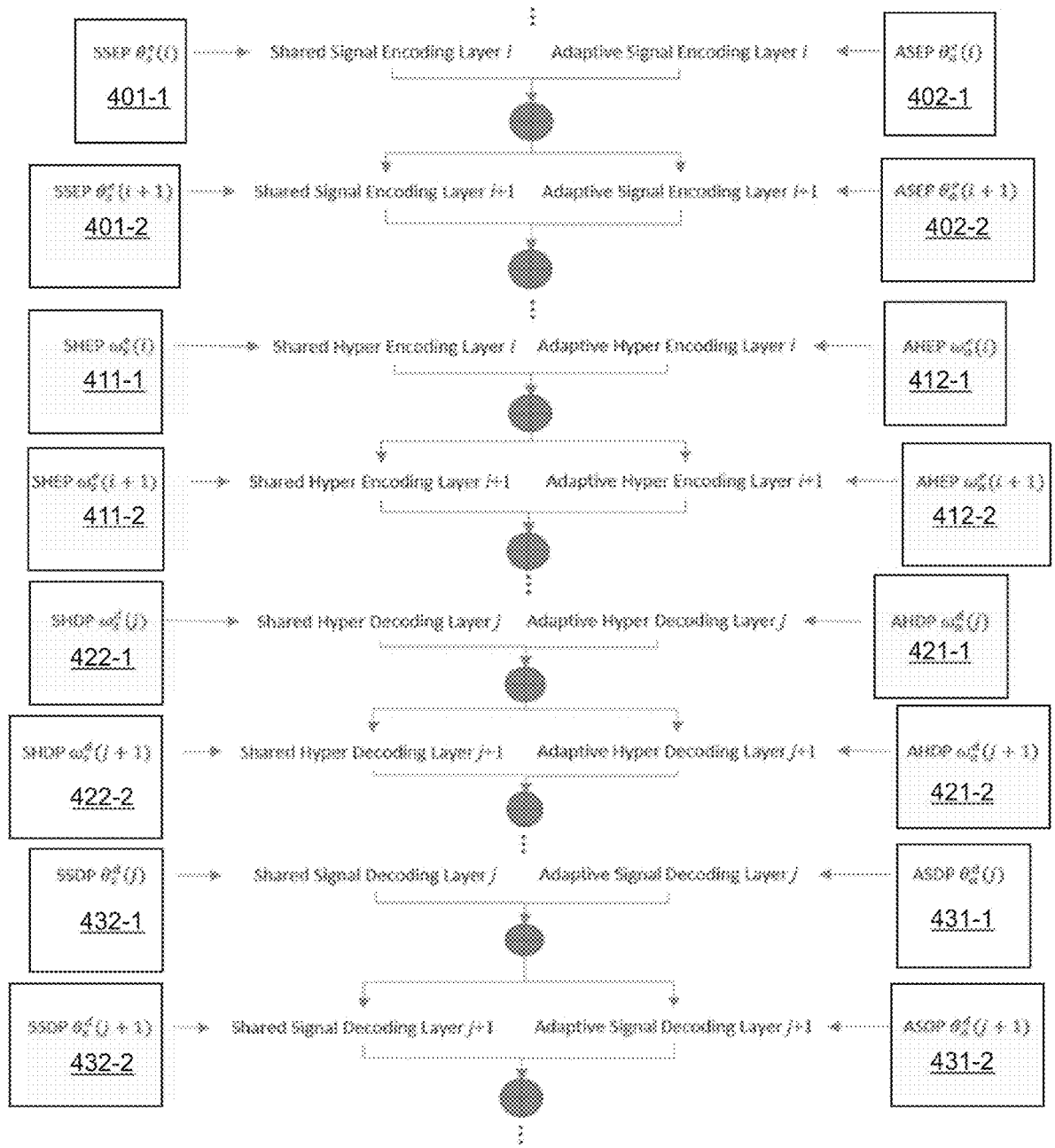
FIG. 4(b) is a diagram of when there is a parameter split within the NN layers.

There may also be a parameter split within NN layers. Let $\theta_s^e(i)$, $\theta_a^e(i)$ denote the SSEP and ASEP for the i-th layer of the NIC signal encoder 400. Let $\omega_s^e(i)$, $\omega_a^e(i)$ denote the SHEP and AHEP for the i-th layer of the NIC hyper encoder 410. Let $\omega_a^d(j)$, $\omega_s^d(j)$ denote the AHDP and SHDP for the j-th layer of the NIC hyper decoder 420. Let $\theta_a^d(j)$, $\theta_s^d(j)$ denote the ASDP and SSDP for the j-th layer of the NIC signal decoder 430. The network computes the inference outputs based on the corresponding inputs for the SSEP and ASEP, or the SHEP and AHEP, or the AHDP and SHDP, or the ASDP and SSDP, respectively. These outputs are combined (e.g., by addition, concatenation, multiplication, etc.) and then sent to the next layer of the NIC module. The output of a layer is the input to the next layer. FIG. 4(b) is an example of when there is a parameter split within the NN layers of the NIC signal encoder 400, hyper encoder 410, hyper decoder 420, and signal decoder 430. The ith layer SSEP $\theta_s^e(i)$ 402-1 and ASEP $\theta_a^e(i)$ 402-1 are combined and input to the next layer SSEP $\theta_s^e(i+1)$ 402-2 and ASEP $\theta_a^e(i+1)$ 402-2, and so on. The last layers of the signal encoder 400 are combined and sent to the hyper encoder 410. The ith layer SHEP $\omega_s^e(i)$ 411-1 and AHEP $\omega_a^e(i)$ 412-1 are combined and input to the next layer SHEP $\theta_s^e(i+1)$ 411-2 and AHEP $\theta_a^e(i+1)$ 412-2, and so on. The last layers of the hyper encoder 410 are combined and sent to the hyper decoder 420. The jth layer AHDP $\omega_a^d(j)$ 421-1 and SHDP $\omega_s^d(j)$ 422-1 are combined and input to the next layer AHDP $\omega_a^d(j+1)$ 421-2 and SHDP $\omega_s^d(j+1)$ 422-2, and so on. The last layers of the hyper decoder 420 are combined and sent to the signal decoder 430. The jth layer ASDP $\theta_a^d(j)$ 431-1 and SSDP $\theta_s^d(j)$ 432-1 are combined and input to the next layer ASDP $\theta_a^d(j+1)$ 431-2 and SSDP $\theta_s^d(j+1)$ 432-2, and so on.

The flow diagram of FIG. 4(a) may be seen as a special case of FIG. 4(b), where layers in the shared signal encoding NN $\theta_s^e(i)$ 402-1 are empty, layers in the adaptive signal encoding NN $\theta_s^e(i)$ 401-1 are empty, layers in the shared hyper encoding NN $\omega_a^e(i)$ 412-1 are empty, layers in the adaptive hyper encoding NN $\omega_s^e(i)$ 411-1 are empty, layers in the shared signal decoding NN $\theta_a^d(j)$ 431-1 are empty, layers in the adaptive signal decoding NN $\theta_s^d(j)$ 432-1 are empty, layers in shared hyper decoding NN $\omega_a^d(j)$ 421-1 are empty, layers in the adaptive hyper decoding NN $\omega_s^d(j)$ 422-1 are empty. Therefore, in other embodiments the network of structure shown in FIG. 4(a) and FIG. 4(b) may be combined, where the NIC architecture has both purely shared encoding/decoding layers and/or purely adaptive encoding/decoding layers, and mixed layers with partial shared encoding/decoding parameters and partial adaptive encoding/decoding parameters.

FIG. 3 shows a general notation, since for a layer that is completely shared, $\theta_a^e(i)$ and/or $\theta_a^d(j)$ and/or $\omega_a^e(i)$ and/or $\omega_a^d(j)$ is empty. For a layer that is completely adaptive, $\theta_s^e(i)$ $\theta_s^d(j)$ and/or $\omega_s^e(i)$ and/or $\omega_s^d(j)$ is empty. Therefore, the notation shown in FIG. 3 may be used for both embodiments of FIG. 4.

Figure 5:
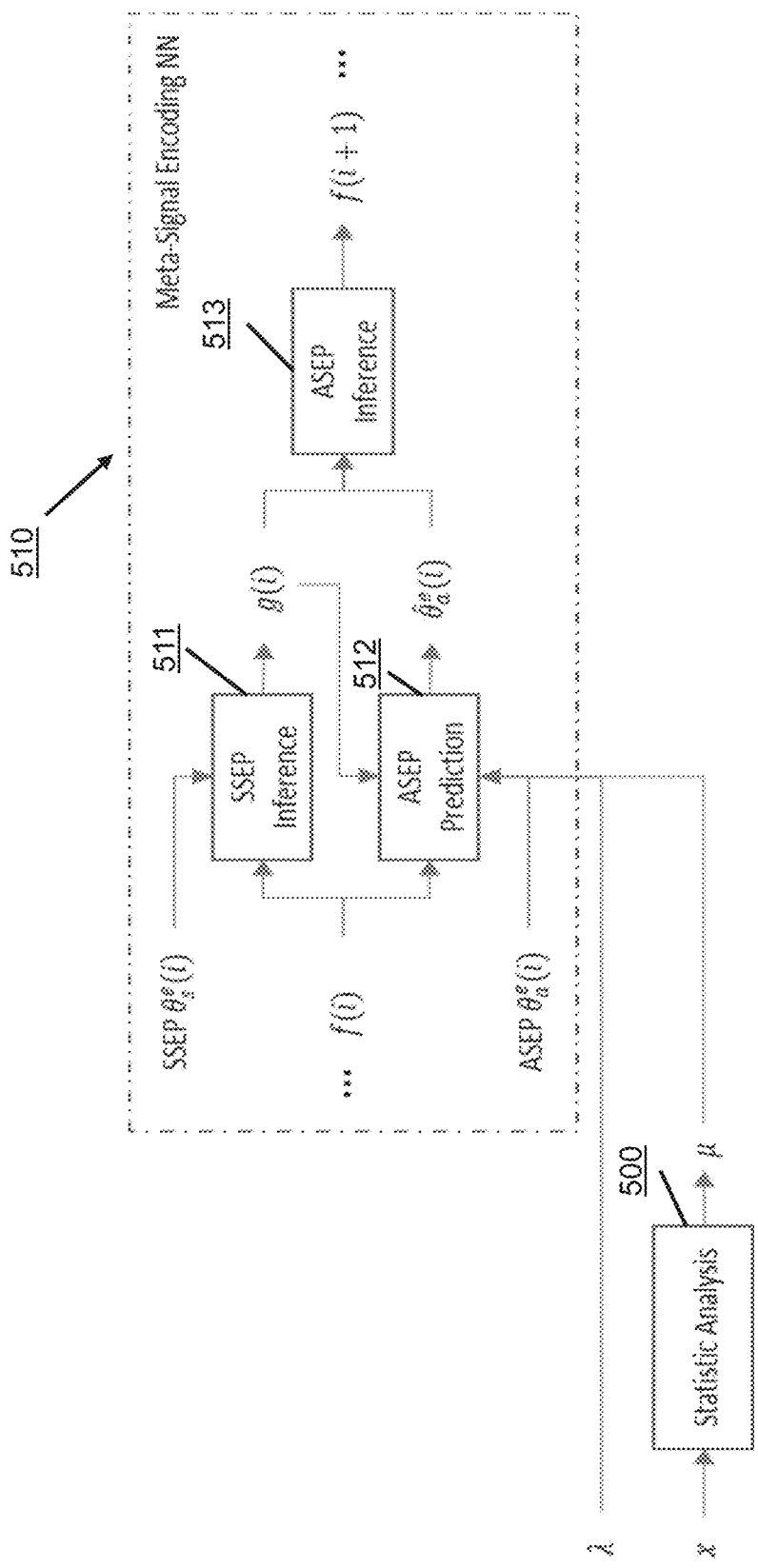
FIG. 5 is a block diagram of the inference workflow of the Meta-Signal Encoding module.

Specifically, with reference to FIG. 3, given an input image x and the hyperparameter $\lambda$, a Meta-Signal Encoding module 310 computes a latent representation y and a statistic feature $\mu$. FIG. 5 is a block diagram of the inference workflow of the Meta-Signal Encoding module 310. In the embodiments, the Meta-Signal Encoding module 310 uses a Statistic Analysis NN 500 and a Meta-Signal Encoding NN 510. The input image x is passed through the Statistic Analysis module 500 to generate the statistic feature $\mu$, which captures the statistical characteristics of the input x. The Statistic Analysis module 500 may use a NN (e.g., comprising of convolution and fully connected layers) to compute the statistic feature $\mu$. The Statistic Analysis module 500 may also use traditional methods (e.g., color and texture extraction methods) to compute the statistic feature $\mu$. Let f(i) and f(i+1) denote the input and output tensor of the i-th layer of the Meta-Signal Encoding NN 510. Based on the input f(i) and SSEP $\theta_s^e(i)$, an SSEP Inference module 511 computes a shared feature g(i) based on a shared inference function $G_i(f(i),\theta_s^e(i))$ (i.e., the function is modeled by the forward computation using the SSEP in the i-th layer). Based on the input f(i), the shared feature g(i), ASEP $\theta_a^e(i)$, statistic feature $\mu$, and hyperparameter $\lambda$, an ASEP Prediction module 512 computes an estimated ASEP $\hat{\theta}_a^e(i)$ for the i-th layer of the Meta-Signal Encoding NN 510.

The ASEP Prediction module 512 is a NN, e.g., comprising of convolution and fully connected layers, which predicts an updated ASEP $\hat{\theta}_a^e(i)$ based on the original ASEP $\theta_a^e(i)$, the current input, the statistic feature $\mu$, and the hyperparameter $\lambda$. In some embodiments, the input f(i) is used as input to the ASEP Prediction module 512. In some other embodiments, the shared feature g(i) is used as input to the ASEP Prediction module 512 instead of the input f(i). In other embodiments, an SSEP loss (not shown in FIG. 5) may be computed based on the shared feature g(i) and the gradient of the loss is used as input to the ASEP Prediction module 512. Based on the estimated ASEP $\hat{\theta}_a^e(i)$ and the shared feature g(i), an ASEP Inference module 513 computes the output tensor f(i+1) based on an ASEP inference function $A_i(g(i), \hat{\theta}_a^e(i))$ (i.e., the function is modeled by the forward computation using the estimated ASEP in the i-th layer).

It is noted that the workflow described in FIG. 5 is a general notation. For a layer that is completely shared with ASEP $\theta_a^e(i)$ being empty, the ASEP-related modules may be omitted and f(i+1)=g(i). For a layer that is completely adaptive with SSEP $\theta_s^e(i)$ being empty, the SSEP-related modules may be omitted and g(i)=f(i).

Figure 6:
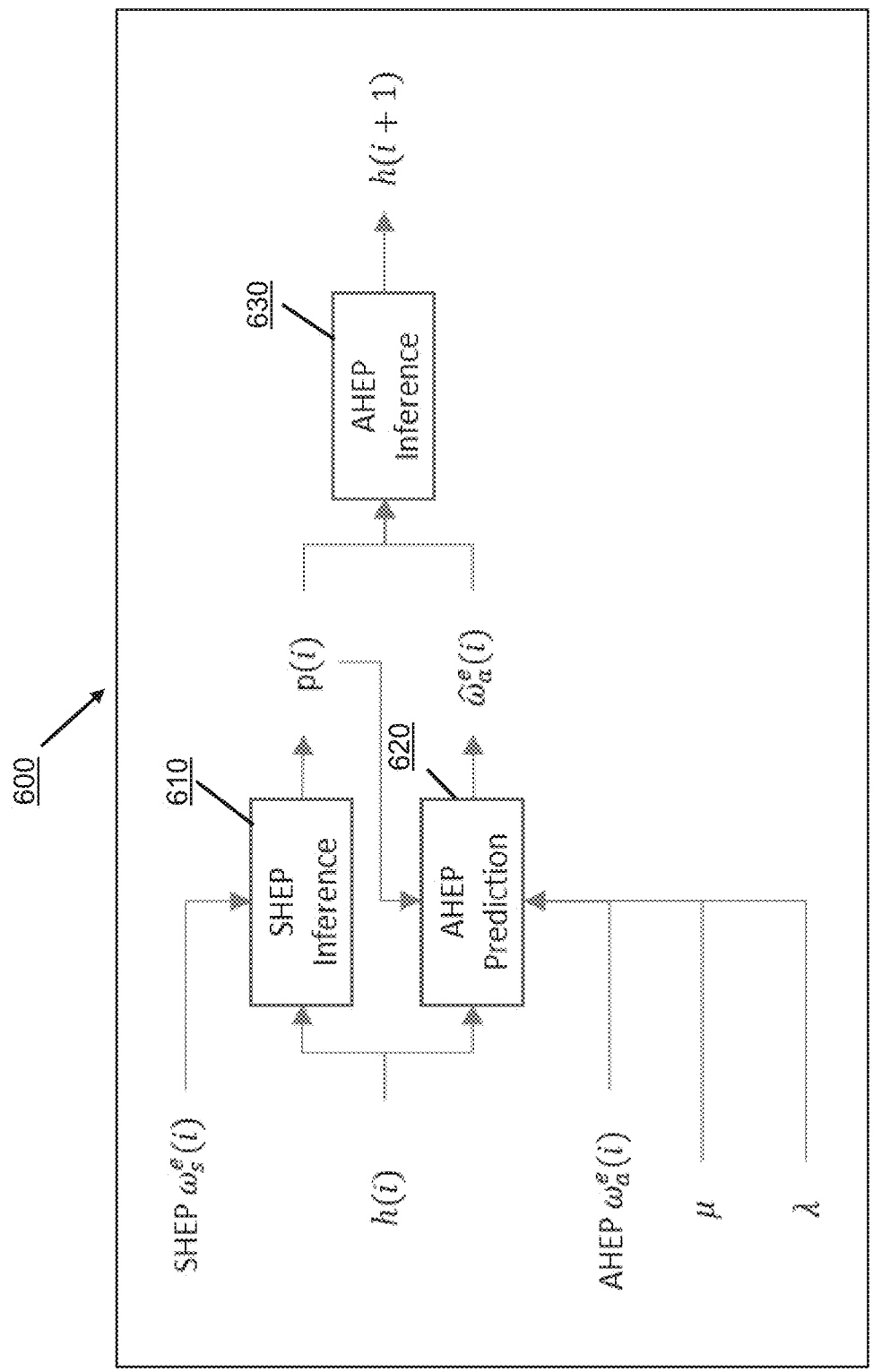
FIG. 6 is a block diagram of the inference workflow of the Meta-Hyper Encoding NN of the Meta-Hyper Encoding module.

Assume there are a total of $N_S$ layers for the Meta-Signal Encoding NN 510, then the output of the last layer is the latent representation y. Then the latent representation y is passed through a Meta-Hyper Encoding module 320 to compute a hyper feature z. FIG. 6 is a block diagram of the inference workflow of the Meta-Hyper Encoding NN 600 of the Meta-Hyper Encoding module 320. Let h(i) and h(i+1) denote the input and output tensor of the i-th layer of the Meta-Hyper Encoding NN 600. Based on the input h(i) and SHEP $\omega_s^e(i)$, an SHEP Inference module 610 computes a shared feature p(i) based on a shared inference function $P_i(h(i), \omega_s^e(i))$ (i.e., the function is modeled by the forward computation using the SHEP in the i-th layer). Based on the input h(i), a shared feature p(i), AHEP $\omega_a^e(i)$, the statistic feature $\mu$, and hyperparameter $\lambda$, an AHEP Prediction module 620 computes an estimated AHEP $\hat{\omega}_a^e(i)$ for the i-th layer of the Meta-Hyper Encoding NN 600.

The AHEP Prediction module 620 is a NN, e.g., comprising of convolution and fully connected layers, which predicts the updated AHEP $\hat{\omega}_a^e(i)$ based on the original AHEP $\omega_a^e(i)$, the current input, the statistic feature $\mu$, and the hyperparameter $\lambda$. In some embodiments, h(i) is used as input to the AHEP Prediction module 620. In some other embodiments, the shared feature p(i) is used as input to the AHEP Prediction module 620 instead of the input h(i). In other embodiments, an SHEP loss (not shown in FIG. 5) may be computed based on the shared feature p(i) and the gradient of the loss is used as input to the ASEP Prediction module 620. Based on the estimated AHEP $\hat{\omega}_a^e(i)$ and the shared feature p(i), an AHEP Inference module 630 computes the output tensor h(i+1) based on an AHEP inference function $A_i(p(i), \hat{\omega}_a^e(i))$ (i.e., the function is modeled by the forward computation using the estimated AHEP in the i-th layer). Again, the workflow described in FIG. 6 is a general notation. For a layer that is completely shared with AHEP $\omega_a^e(i)$ being empty, the AHEP-related modules are omitted and h(i+1)=p(i). For a layer that is completely adaptive with SHEP$\omega_s^e(i)$ being empty, the SHEP-related modules are omitted and p(i)=h(i).

Assume there are a total of $N_H$ layers for the Meta-Hyper Encoding NN 600, then the output of the last layer is the hyper feature z. Then latent representation y is passed through a Signal Q & AE module 330 to be further compressed (through quantization and arithmetic entropy coding) into a compact representation y'. The statistic feature $\mu$ is passed through a Meta Q & AE module 332 to generate a compact meta feature $\mu$'. The hyper feature z is passed through a Hyper Q & AE module 331 to generate a compact hyper feature z'. The compact representation y', compact meta feature $\mu$', and compact hyper feature z', as well as hyperparameter $\lambda$, are then sent to the decoder (as shown in FIG. 3). In the embodiment, the latent representation y is passed through the Signal Q & AE module 330, then the statistic feature $\mu$ is passed through the Meta Q & AE module 332, then the hyper feature z is passed through the Hyper Q & AE module 331. However, this disclosure is not restricted to this order.

On the decoder side, the received compact representation y' is passed through a Signal AD & DQ module 340 to compute a recovered latent representation $\bar{y}$ (through the arithmetic entropy decoding and dequantization process). Similarly, the compact meta feature $\mu$' is passed through a Meta AD & DQ module 342 to compute a recovered statistic feature $\bar{\mu}$. The compact hyper feature z' is passed through a Hyper AD & DQ module 341 to compute a recovered hyper feature $\bar{z}$ (as shown in FIG. 3).

Figure 7:
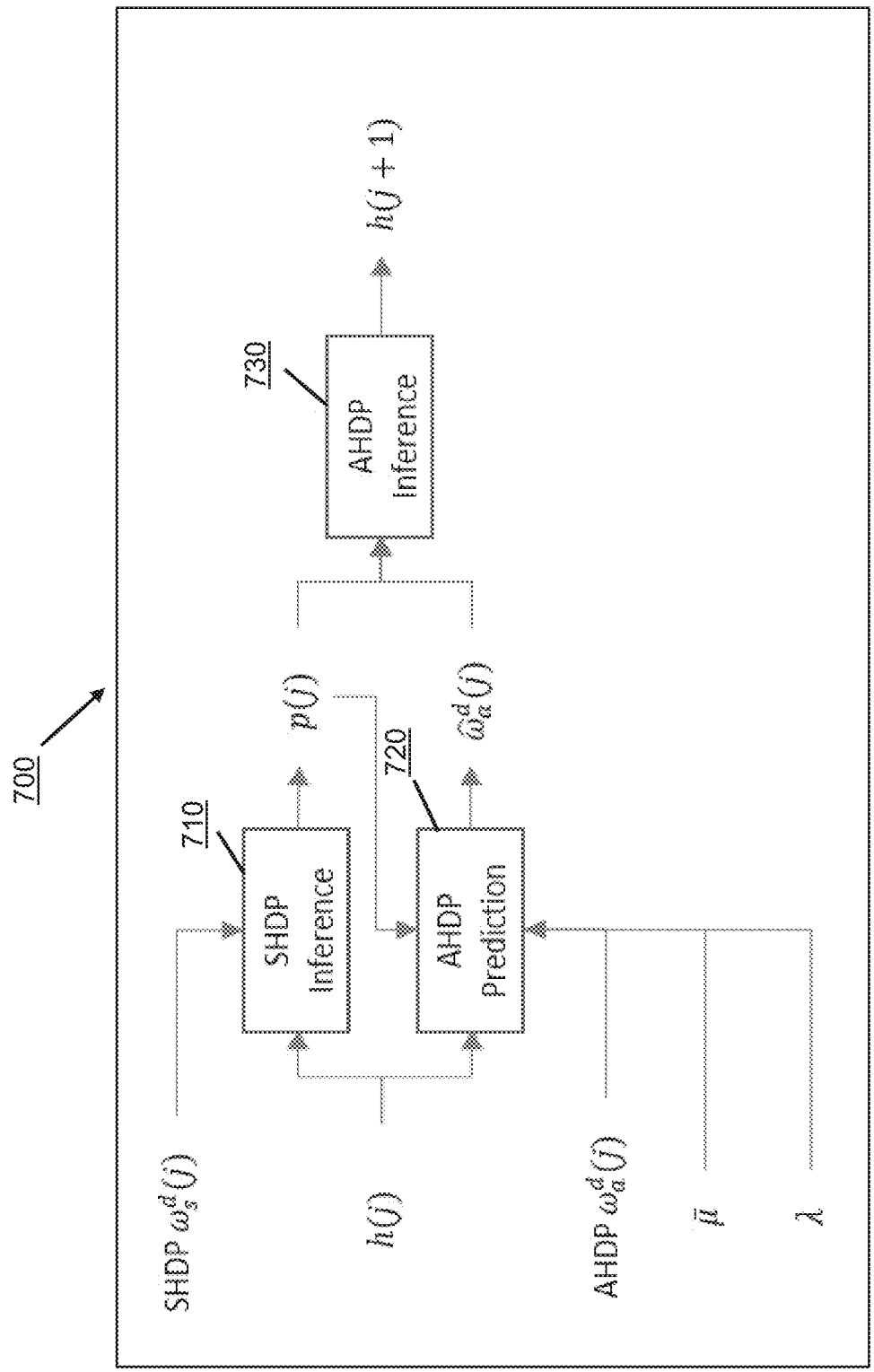
FIG. 7 is a block diagram of the inference workflow of the Meta-Hyper Decoding NN of the Meta-Hyper Decoding module.

Then the hyper feature $\bar{z}$ is passed through a Meta-Hyper Decoding module 350 to compute a hyper prior feature $\bar{z}$'. FIG. 7 is a block diagram of the inference workflow of the Meta-Hyper Decoding NN 700 of the Meta-Hyper Decoding module 350. Let h(j) and h(j+1) denote the input and output tensor of the j-th layer of the Meta-Hyper Decoding NN 700. Based on the input h(j) and SHDP $\omega_s^d(j)$, an SHDP Inference module 710 computes a shared feature p(j) based on a shared inference function $P_j(h(j), \omega_s^d(j))$ (i.e., the function is modeled by the forward computation using the SHDP in the j-th layer). Based on the input h(j), the shared feature p(j), AHDP $\omega_a^d(j)$, the recovered statistic feature $\bar{\mu}$, and hyperparameter $\lambda$, an AHDP Prediction module 720 computes an estimated AHDP $\hat{\omega}_a^d(j)$ for the j-th layer. The AHDP Prediction module 720 is a NN, e.g., comprising of convolution and fully connected layers, which predicts the updated AHDP $\hat{\omega}_a^d(j)$ based on the original AHDP $\omega_a^d(j)$, the current input, the recovered statistic feature $\bar{\mu}$, and the hyperparameter $\lambda$. In some embodiments, the input h(j) is used as input to the AHDP Prediction module 720. In some other embodiments, the shared feature p(j) is used as input to the AHDP Prediction module 720 instead of the input h(j). In other embodiments, an SHDP loss (not shown in FIG. 7) may be computed based on the shared feature p(j) and the gradient of the loss is used as input to the ASDP Prediction module 720. Based on the estimated AHDP $\hat{\omega}_a^d(j)$ and the shared feature p(j), an AHDP Inference module 730 computes the output tensor h(j+1) based on an AHDP inference function $A_j(p(j), \hat{\omega}_a^d(j))$ (i.e., the function is modeled by the forward computation using the estimated AHDP in the j-th layer). Similar to the encoder workflow described in FIGS. 5 and 6, the workflow described in FIG. 7 is a general notation. For a layer that is completely shared with AHDP to $\omega_a^d(j)$ being empty, the AHDP-related modules are omitted and h(j+1)=p(j). For a layer that is completely adaptive with SHDP $\omega_s^d(j)$ being empty, the SHDP-related modules are omitted and p(j)=h(j).

Figure 8:
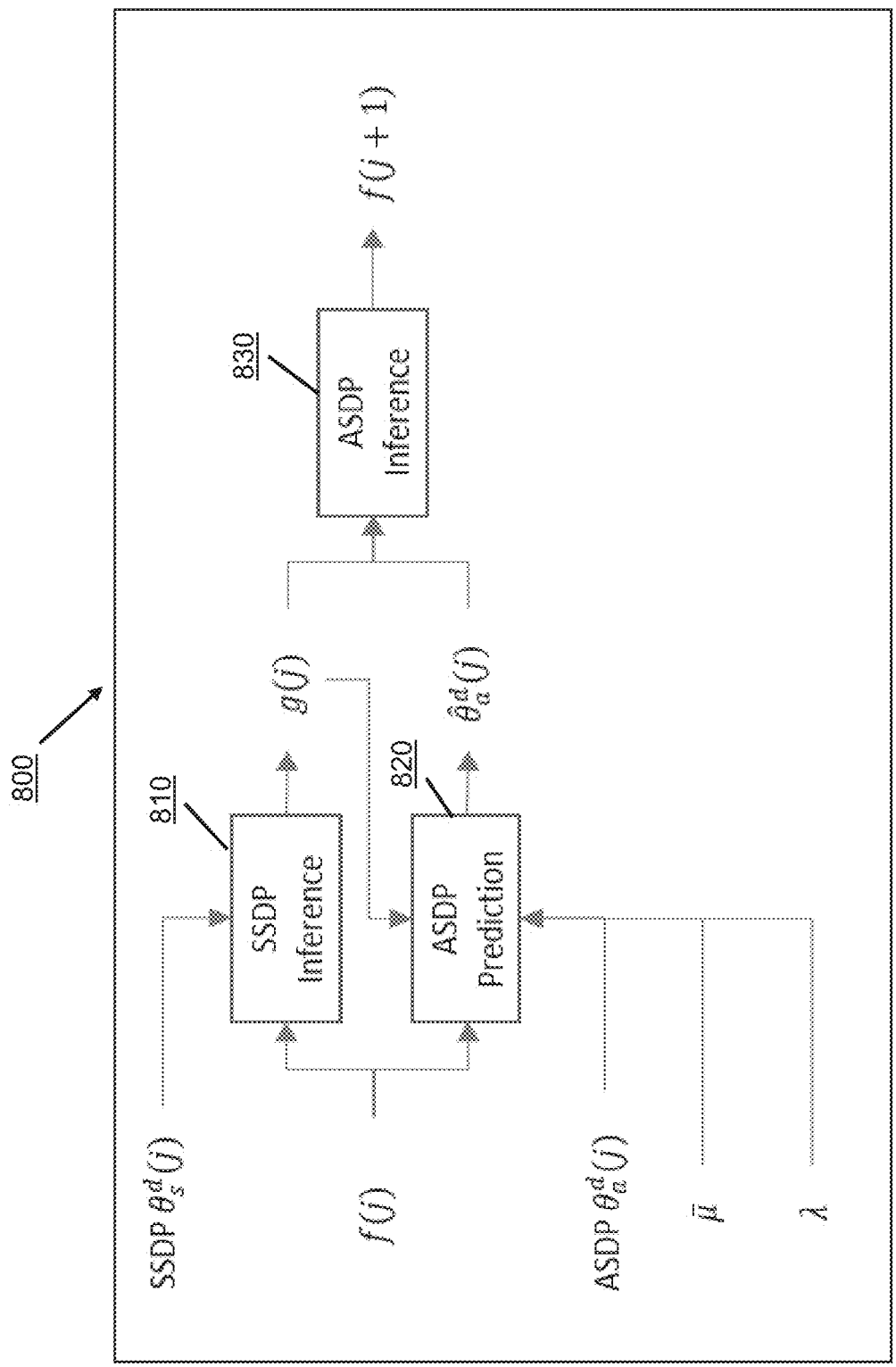
FIG. 8 is a block diagram of the inference workflow of the Meta-Signal Decoding NN of the Meta-Hyper Decoding module.

Assume there are a total of $M_H$ layers for the Meta-Hyper Decoding NN 700, then the output of the last layer is the hyper prior feature $\bar{z}$'. Then the hyper prior feature $\bar{z}$' and the recovered latent representation $\bar{y}$ are passed through a Meta-Signal Decoding module 360 to compute the reconstructed image $\bar{x}$. FIG. 8 is a block diagram of the inference workflow of the Meta-Signal Decoding NN 800 of the Meta-Signal Decoding module 360. Let f(j) and f(j+1) denote the input and output tensor of the j-th layer of the Meta-Signal Decoding NN 800. Based on the input f(j) and SSDP $\theta_s^d(j)$, an SSDP Inference module 810 computes a shared feature g(j) based on a shared inference function $G_j(f(j), \theta_s^d(j))$ (i.e., the function is modeled by the forward computation using the SSDP in the j-th layer). Based on the input f(j), the shared feature g(j), ASDP $\theta_a^d(j)$, the recovered statistic feature $\bar{\mu}$, and hyperparameter $\lambda$, an ASDP Prediction module 820 computes an estimated ASDP $\hat{\theta}_a^d(j)$ for the j-th layer. The ASDP Prediction module 820 is a NN, e.g., comprising of convolution and fully connected layers, which predicts the updated ASDP $\hat{\theta}_a^d(j)$ based on the original ASDP $\theta_a^d(j)$, the current input, the recovered statistic feature $\bar{\mu}$, and the hyperparameter $\lambda$. In some embodiments, the input f(j) is used as input to the ASDP Prediction module 820. In some other embodiments, the shared feature g(j) is used as input to the ASDP Prediction module 820 instead of the input f(j). In other embodiments, an SSDP loss (not shown in FIG. 8) may be computed based on the shared feature g(j) and the gradient of the loss is used as input to the ASDP Prediction module 820. Based on the estimated ASDP $\hat{\theta}_a^d(j)$ and the shared feature g(j), an ASDP Inference module 830 computes the output tensor f(j+1) based on an ASDP inference function $A_j(g(j), \hat{\theta}_a^d(j))$ (i.e., the function is modeled by the forward computation using the estimated ASDP in the j-th layer). The workflow described in FIG. 8 is a general notation. For a layer that is completely shared with ASDP $\theta_a^d(j)$ being empty, the ASDP-related modules are omitted and f(i+1)=g(j). For a layer that is completely adaptive with SSDP $\theta_s^d(j)$ being empty, the SSDP-related modules are omitted and g(j)=f(j).

Assume there are a total of $M_S$ layers for the Meta-Signal Decoding NN 800, then the output of the last layer is the reconstructed image $\bar{x}$. Note that the proposed Ada-NIC framework supports adaptive image compression over arbitrary smooth image data distribution. As a special case, instead of predicting arbitrary model parameters, the ASEP Prediction module 512 may perform prediction in a way of selecting from a set of pre-trained ASEP, each pre-trained ASEP corresponding to a training dataset with a target data distribution. Similarly, the AHEP Prediction module 620, the AHDP Prediction module 720, and/or the ASDP Prediction module 820 may select model parameters from a set of pre-trained AHEP, AHDP, and/or ASDP. In such as case, the Ada-NIC method reduces to an adaptive NIC model selection method, where the optimal pre-trained model instance is automatically selected based on the current input image.

The training process aims at learning the SSEP $\theta_s^e(i)$ and the ASEP $\theta_a^e(i)$, i=1, ..., $N_S$ for the Meta-Signal Encoding NN 510, the SHEP of $\omega_s^e(i)$ and the AHEP $\omega_a^e(i)$, i=1, ..., $N_H$ for the Meta-Hyper Encoding NN 600, the SHDP $\omega_s^d(j)$ and the AHDP $\omega_a^d(j)$, j=1, ..., $M_H$ for the Meta-Hyper Decoding NN 700, the SSDP $\theta_s^d(j)$ and ASDP $\theta_a^d(j)$, j=1, ..., $M_S$ for the Meta-Signal Decoding NN 800, as well as the ASEP Prediction NN (model parameters denoted as $\Phi_S^e$), the AHEP Prediction NN (model parameters denoted as $\Phi_H^e$), the ASDP Prediction NN (model parameters denoted as $\Phi_S^d$), and the AHDP Prediction NN (model parameters denoted as $\Phi_H^d$).

Figure 9:
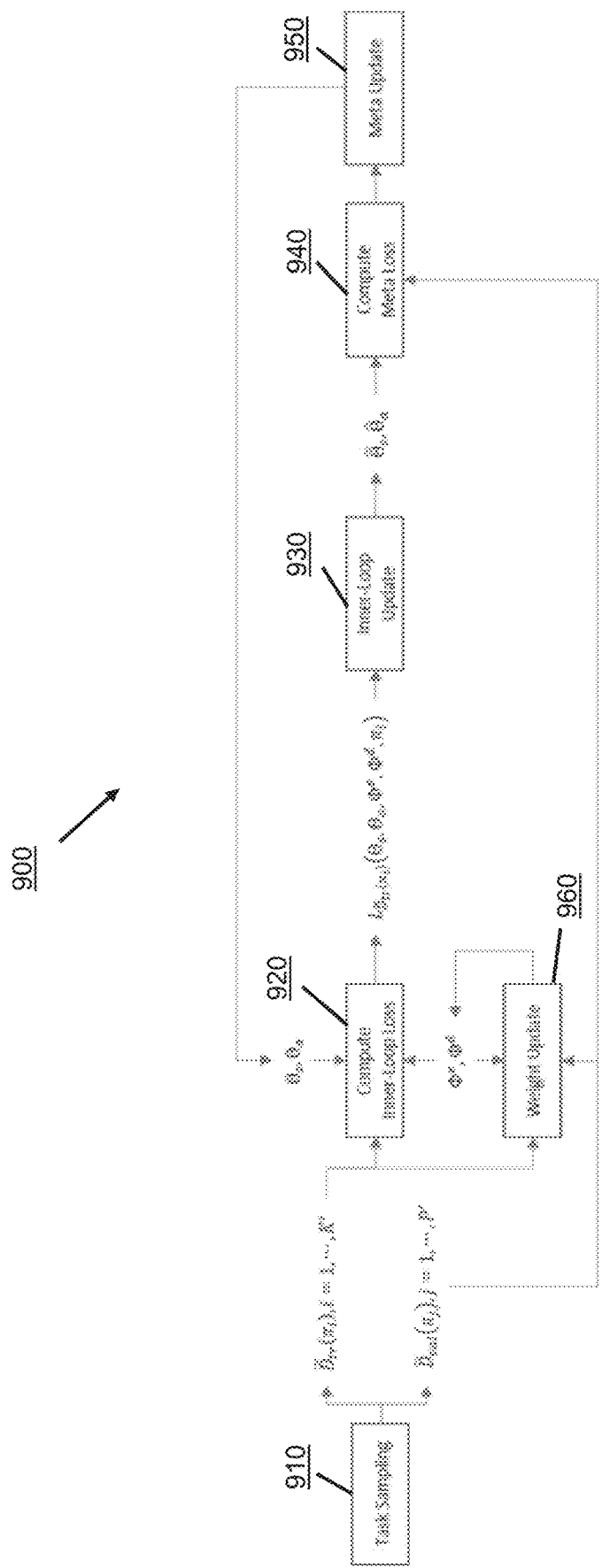
FIG. 9 is a workflow of the Ada-NIC model meta-training process.

In the embodiments, a Model-Agnostic Meta-Learning (MAML) mechanism is used for the training purposes. FIG. 9 is a workflow of the Ada-NIC model meta-training process 900. Other meta-training algorithms may certainly be used here as well.

Specifically, for training, there is a set of training data $D_{tr}(\pi_i)$, i=1, ..., K, where each $D_{tr}(\pi_i)$ corresponds to a training data distribution $\pi_i$, and there are K training data distributions in total. Note that this is a general notation, since each training data can be treated as an individual distribution and K will be the same as the size of the entire training set. In addition, there is a set of validation data $D_{val}(\pi_j)$, j=1, ..., P, where each $D_{val}(\pi_j)$ corresponds to a validation data distribution $\pi_j$. The validation data distributions include the data distributions in the training set. The validation data distributions may also include data distributions not included in the training set.

The goal of the training process is to learn the Ada-NIC model so that it can be broadly applied to all (including training and future unseen) data distributions, under the assumption that the NIC task with a target data distribution is drawn from a task distribution $P(\pi_j)$. To achieve this, the loss for learning the Ada-NIC model is minimized across all training data sets across all training data distributions.

Let $\Theta_s = \{\theta_s^e, \theta_s^d, \omega_s^e, \omega_s^d\}$ include all shared model parameters, and let $\Theta_a = \{\theta_a^e, \theta_a^d, \omega_a^e, \omega_a^d\}$ include all adaptive model parameters. Let $\Phi^e = \{\Phi_S^e, \Phi_H^e\}$ include all the prediction model parameters on the encoder side (400, 410), and let $\Phi^d = \{\Phi_S^d, \Phi_H^d\}$ include all the prediction model parameters on the decoder side (420, 430). The MAML training process 900 has an outer loop and an inner loop for gradient-based parameter updates. For each outer loop iteration, in the Task Sampling module 910, a set of K' training data distributions (K'≤K) is first sampled. Then, for each sampled training data distribution $\pi_i$, a set of training data $\tilde{D}_{tr}(\pi_i)$ from $D_{tr}(\pi_i)$ is sampled. A set of P' (P'≤P) validation data distributions is also sampled. For each sampled validation $\pi_j$, a set of validation data $\tilde{D}_{val}(\pi_j)$ from $D_{val}(\pi_j)$ is sampled. Then, for each sampled datum $x \in \tilde{D}_{tr}(\pi_i)$, the Ada-NIC forward computation based on the current parameters $\Theta_s$, $\Theta_a$, $\Phi^e$ and $\Phi^d$, is conducted. The accumulated inner-loop loss $L_{\tilde{D}_{tr}(\pi_i)}(\Theta_s, \Theta_a, \Phi^e, \Phi^d, \pi_i)$ is then computed in the Compute Inner-Loop Loss module 920 according to Equation (2):

$$L_{\tilde{D}_{tr}(\pi_i)}(\Theta_s, \Theta_a, \Phi^e, \Phi^d, \pi_i) = \Sigma_{x \in \tilde{D}_{tr}(\pi_i)} L(x, \Theta_s, \Theta_a, \Phi^e, \Phi^d, \pi_i) \quad (2)$$

The loss function $L(x, \Theta_s, \Theta_a, \Phi^e, \Phi^d, \pi_i)$ comprises of the R-D loss described in Equation (1) and other regularization losses (e.g., auxiliary loss of distinguishing the intermediate network output targeting at different trade-offs). Then, based on $L_{\tilde{D}_{tr}(\pi_i)}(\Theta_s, \Theta_a, \Phi^e, \Phi^d, \pi_i)$, given step size $\alpha_{si}$ and $\alpha_{ai}$ as hyperparameters for $\pi_i$, an updated task-specific parameter is computed in the Inner-Loop Update module 930 according to Equations (3) and (4):

$$\hat{\Theta}_a = \Theta_a - \Sigma_{i=1}^{K'} \alpha_{ai} \nabla_{\Theta_a} L_{\tilde{D}_{tr}(\pi_i)}(\Theta_s, \Theta_a, \Phi^e, \Phi^d, \pi_i), \quad (3)$$

$$\hat{\Theta}_s = \Theta_s - \Sigma_{i=1}^{K'} \alpha_{si} \nabla_{\Theta_s} L_{\tilde{D}_{tr}(\pi_i)}(\Theta_s, \Theta_a, \Phi^e, \Phi^d, \pi_i) \quad (4)$$

The gradient $\nabla_{\Theta_a} L_{\tilde{D}_{tr}(\pi_i)}(\Theta_s, \Theta_a, \Phi^e, \Phi^d, \pi_i)$ and $\nabla_{\Theta_s} L_{\tilde{D}_{tr}(\pi_i)}(\Theta_s, \Theta_a, \Phi^e, \Phi^d, \pi_i)$ of the accumulated inner-loop loss $L_{\tilde{D}_{tr}(\pi_i)}(\Theta_s, \Theta_a, \Phi^e, \Phi^d, \pi_i)$ is used to compute the updated version of the adaptive parameters $\hat{\Theta}_a$ and $\hat{\Theta}_s$, respectively.

Then an outer meta objective can be computed over all sampled validation data distributions in the Compute Meta Loss module 940 according to Equations (5) and (6):

$$L(\Theta_s, \Theta_a, \Phi^e, \Phi^d) = \Sigma_{j=1}^{P'} L_{\tilde{D}_{val}(\pi_j)}(\hat{\Theta}_s, \hat{\Theta}_a, \Phi^e, \Phi^d, \pi_j), \quad (5)$$

$$L_{\tilde{D}_{val}(\pi_j)}(\hat{\Theta}_s, \hat{\Theta}_a, \Phi^e, \Phi^d, \pi_j) = \Sigma_{x \in \tilde{D}_{val}(\pi_j)} L(x, \hat{\Theta}_s, \hat{\Theta}_a, \Phi^e, \Phi^d, \pi_j) \quad (6)$$

where $L(x, \hat{\Theta}_s, \ddot{\Theta}_a, \Phi_s, \Phi^a, \pi_j)$ is the loss computed for input x based on the Ada-NIC forward computation using parameters $\hat{\Theta}_s, \hat{\Theta}_a, \Phi_s, \Phi^a$.

Given step size $\beta_{aj}$ and $\beta_{sj}$ as hyperparameters for $\pi_j$, the model parameters in the Meta Update module 950 are updated according to Equations (7) and (8):

$$\Theta_a = \Theta_a - \Sigma_{j=1}^{P'} \beta_{aj} \nabla_{\Theta_a} L_{\hat{D}_{val}(\pi_j)}(\hat{\Theta}_s, \hat{\Theta}_a, \Phi^e, \Phi^d, \pi_j) \quad (7)$$

$$\Theta_s = \Theta_s - \Sigma_{j=1}^{P'} \beta_{sj} \nabla_{\Theta_s} L_{\hat{D}_{val}(\pi_j)}(\hat{\Theta}_s, \hat{\Theta}_a, \Phi^e, \Phi^d, \pi_j) \quad (8)$$

In some embodiments, $\Theta_s$ may not be updated in the inner loop, i.e., $\alpha_{si}=0$, $\hat{\Theta}_s=\Theta_s$. This may help to stabilize the training process.

As for parameters $\Phi^e$, $\Phi^d$ of the ASEP Prediction NN, AHEP Prediction NN, the ASDP prediction NN 820, and the AHDP Prediction NN 720, they are updated in a regular training manner in the Weight Update module 960. That is, according to the training and validation data $D_{tr}(\pi_i)$, $i=1, \ldots, K$, $D_{val}(\pi_j), j=1, \ldots, P$, based on the current $\Theta_s, \Theta_a$, $\Phi^e$, $\Phi^d$, the loss $L(x, \Theta_s, \Theta_a, \Phi^e, \Phi^d, \pi_i)$ may be computed for all samples $x \in D_{tr}(\pi_i)$ and $L(x, \Theta_s, \Theta_a, \Phi^e, \Phi^d, \pi_j)$ for all samples $x \in D_{val}(\pi_j)$. The gradients of all these losses can be accumulated (e.g. added up) to perform parameter updates over $\Phi^e$, $\Phi^d$ through regular back-propagation.

Note that this disclosure does not put any restrictions on the specific optimization algorithm or loss functions for updating these model parameters.

For the special case, where the ASEP Prediction module 512, the AHEP Prediction module 620, the ASDP prediction module 820 and the AHDP prediction module of the Ada-NIC model only perform prediction over the pre-defined set of training data distributions, the validation data distribution will be the same with the training ones. The same MAML training procedure can be used to train this reduced Ada-NIC model.

Figure 10:
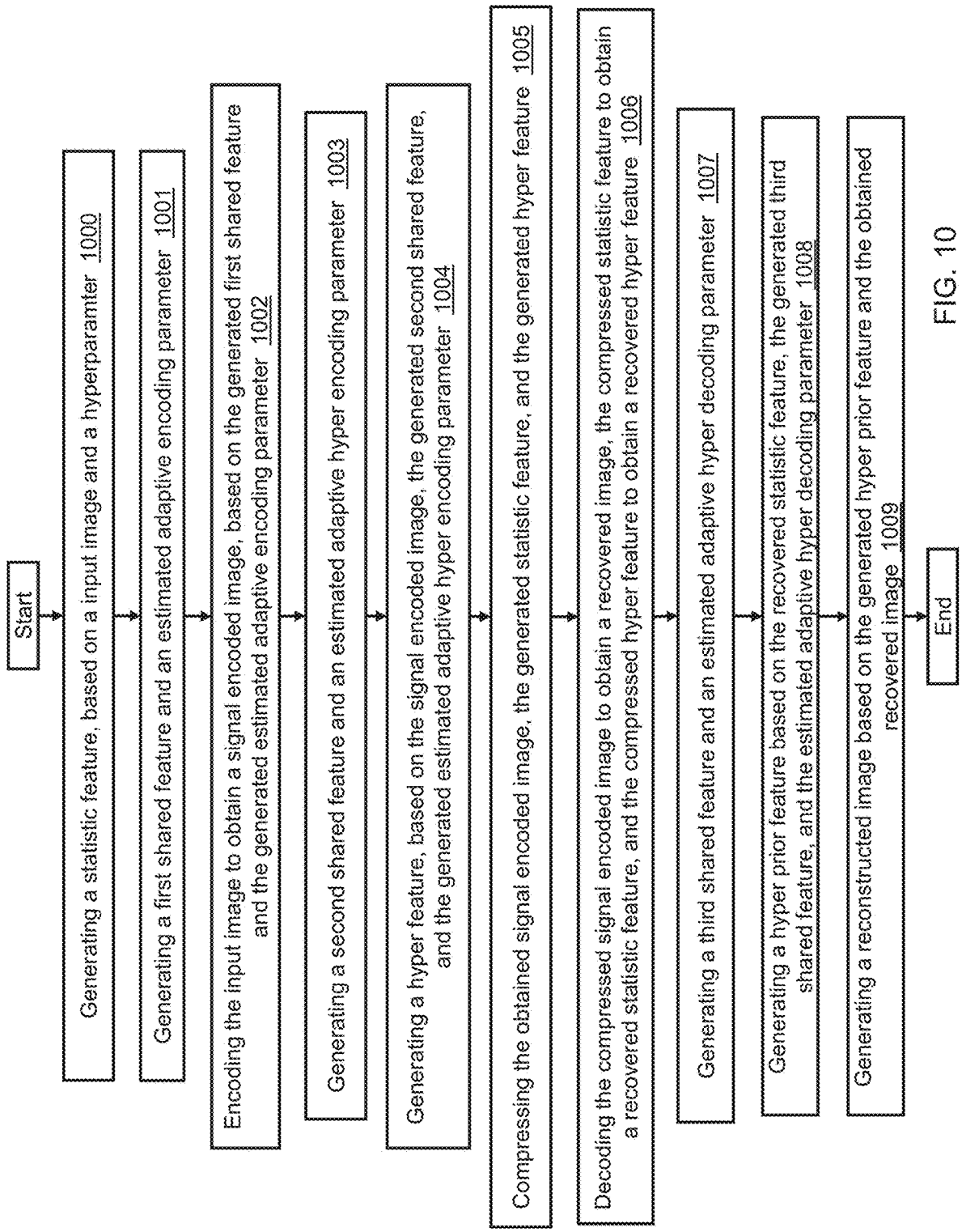
FIG. 10 is a flowchart of a method of automatic adaptive neural image compression with flexible hyperprior parameters by meta-learning.

FIG. 10 is a flowchart of a method of automatic adaptive neural image compression with flexible hyperprior parameters by meta-learning, according to the embodiments.

In some implementations, one or more process blocks of FIG. 10 may be performed by the platform 120. In some implementations, one or more process blocks of FIG. 10 may be performed by another device or a group of devices separate from or including the platform 120, such as the user device 110.

As shown in FIG. 10, in operation 1000, the method includes generating a statistic feature, based on an input image and a hyperparameter.

In operation 1001, the method of FIG. 10 includes generating a first shared feature and an estimated adaptive encoding parameter.

In operation 1002, the method of FIG. 10 includes encoding the input image to obtain a signal encoded image, based on the generated first shared feature and the generated estimated adaptive encoding parameter.

In operation 1003, the method of FIG. 10 includes generating a second shared feature and an estimated adaptive hyper encoding parameter.

In operation 1004, the method of FIG. 10 includes generating a hyper feature, based on the signal encoded image, the generated second shared feature, and the generated estimated adaptive hyper encoding parameter.

In operation 1005, the method of FIG. 10 includes compressing the obtained signal encoded image, the generated statistic feature, and the generated hyper feature.

In operation 1006, the method of FIG. 10 includes decoding the compressed signal encoded image to obtain a recovered image, the compressed statistic feature to obtain a recovered statistic feature, and the compressed hyper feature to obtain a recovered hyper feature.

In operation 1007, the method of FIG. 10 includes generating a third shared feature and an estimated adaptive hyper decoding parameter.

In operation 1008, the method of FIG. 10 includes generating a hyper prior feature based on the recovered statistic feature, the generated third shared feature, and the estimated adaptive hyper decoding parameter.

In operation 1009, the method of FIG. 10 includes generating a reconstructed image based on the generated hyper prior feature and the obtained recovered image.

Although FIG. 10 shows example blocks of the method, in some implementations, the method may include additional blocks, fewer blocks, different blocks, or differently arranged blocks than those depicted in FIG. 10. Additionally, or alternatively, two or more of the blocks of the method may be performed in parallel.

According to the embodiments, the flowchart method shown in FIG. 10 may be implemented in each layer of the NN of the signal encoder and decoder modules. Additionally, the method of FIG. 10 may also be implemented on each layer when there is a parameter split within the NN layers of the encoder and decoder modules (as shown in FIG. 4(*b*)).

Figure 11:
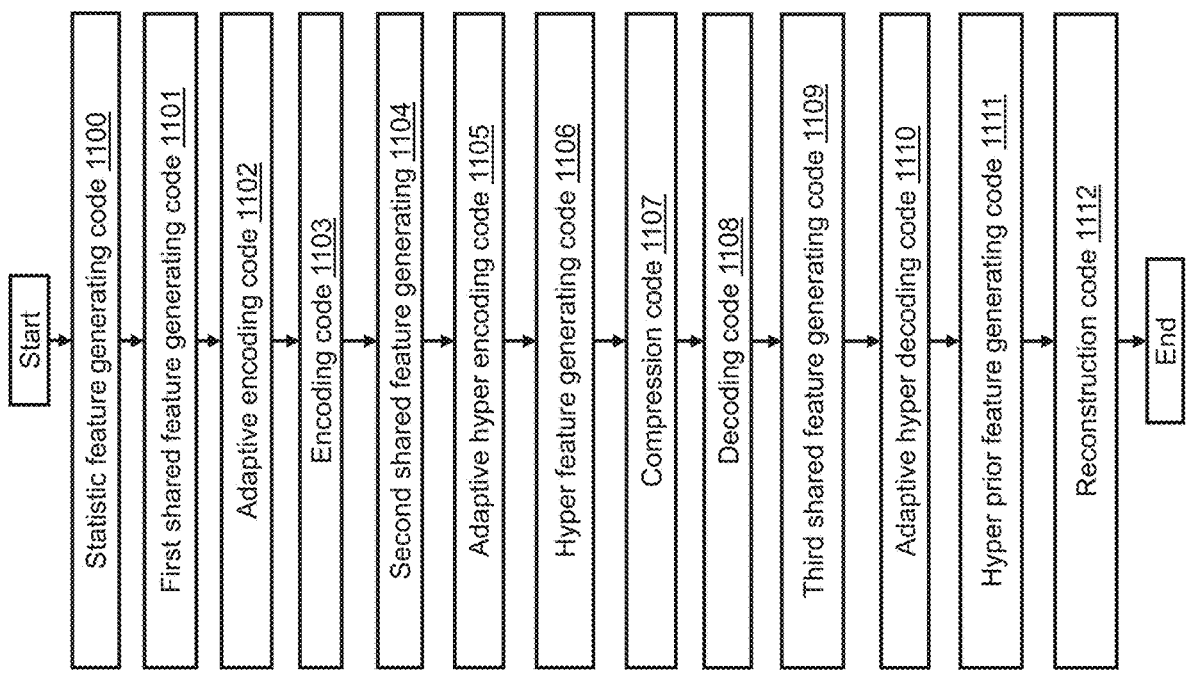
FIG. 11 is a block diagram of an apparatus for automatic adaptive neural image compression with flexible hyperprior parameters by meta-learning.

FIG. 11 is a block diagram of an apparatus for automatic adaptive neural image compression with flexible hyperprior parameters by meta-learning, according to the embodiments.

As shown in FIG. 11, the apparatus includes statistic feature generating code 1100, first shared feature generating code 1101, adaptive encoding code 1102, encoding code 1103, second shared feature generating 1104, adaptive hyper encoding code 1105, hyper feature generating code 1106, compression code 1107, decoding code 1108, third shared feature generating code 1109, adaptive hyper decoding code 1110, and hyper prior feature generating code 1111, and reconstruction code 1112.

The statistic feature generating code 1100 is configured to cause the at least one processor to generate a statistic feature based on an input image and a hyperparameter.

The first shared feature generating code 1101 is configured to cause the at least one processor to generate a first shared feature.

The adaptive encoding code 1102 is configured to cause the at least one processor to generate an estimated adaptive encoding parameter.

The encoding code 1103 is configured to cause the at least one processor to encode the input image to obtain a signal encoded image, based on the generated first shared feature and the generated estimated adaptive encoding parameter.

The second shared feature generating code 1104 is configured to cause the at least one processor to generate a second shared feature.

The adaptive hyper encoding code 1105 configured to cause the at least one processor to generate an estimated adaptive hyper encoding parameter.

The hyper feature generating code 1106 is configured to cause the at least one processor to generate a hyper feature based on the obtained signal encoded image, the generated second shared feature, and the generated estimated adaptive hyper encoding parameter.

The compression code 1107 is configured to cause the at least one processor to compress the obtained the signal encoded image, the generated statistic feature, and the hyper feature.

The decoding code 1108 configured to cause the at least one processor to decode the compressed signal encoded image to obtain a recovered image, the compressed statistic feature to obtain a recovered statistic feature, and the compressed hyper feature to obtain a recovered hyper feature.

The third shared feature generating code 1109 configured to cause the at least one processor to generate a third shared feature.

The adaptive hyper decoding code 1110 configured to cause the at least one processor to generate an estimated adaptive hyper decoding parameter.

The hyper prior feature generating code 1111 configured to cause the at least one processor to generate a hyper prior feature based on the recovered statistic feature, the generated third shared feature, and the generated estimated adaptive hyper decoding parameter.

The reconstruction code configured 1112 to cause the at least one processor to generate a reconstructed image based on the hyper prior feature and the recovered image.

Although FIG. 11 shows example blocks of the apparatus, in some implementations, the apparatus may include additional blocks, fewer blocks, different blocks, or differently arranged blocks than those depicted in FIG. 11. Additionally, or alternatively, two or more of the blocks of the apparatus may be combined.

The embodiments describe automatic adaptive NIC according to the characteristics of the input image. The benefits of this include supporting both flexible model parameter prediction for arbitrary smooth data distributions and pre-trained model selection. Further, the embodiments include a flexible and general framework that accommodates various underlying NIC models, structures, and meta-learning methods.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of adaptive neural image compression with a hyperprior model by meta-learning, the method being performed by at least one processor, and the method comprising:
    generating a statistic feature, based on an input image and a hyperparameter;
    generating a first shared feature and an estimated adaptive encoding parameter;
    encoding the input image to obtain a signal encoded image, based on the generated first shared feature and the generated estimated adaptive encoding parameter;
    generating a second shared feature and an estimated adaptive hyper encoding parameter;
    generating a hyper feature, based on the signal encoded image, the generated second shared feature, and the generated estimated adaptive hyper encoding parameter;
    compressing the obtained signal encoded image, the generating statistic feature, and the generated hyper feature;
    decoding the compressed signal encoded image to obtain a recovered image, the compressed statistic feature to obtain a recovered statistic feature, and the compressed hyper feature to obtain a recovered hyper feature;
    generating a third shared feature and an estimated adaptive hyper decoding parameter;
    generating a hyper prior feature, based on the recovered statistic feature, the generated third shared feature, and the generated estimated adaptive hyper decoding parameter; and
    generating a reconstructed image, based on the generated hyper prior feature and the obtained recovered image.

2. The method of claim 1, further comprising:
    generating the first shared feature of a layer in a plurality of layers in a first neural network, based on the generated statistic feature and a shared signal encoding parameter; and
    performing convolution to compute the estimated adaptive encoding parameter, based on the generated first shared feature, the static feature, and an adaptive signal encoding parameter.

3. The method of claim 2, wherein the estimated adaptive encoding parameter is updated in the plurality of layers of the first neural network.

4. The method of claim 2, further comprising computing an encoded output of the layer in the plurality of layers of the first neural network, based on the generated first shared feature and the estimated adaptive encoding parameter,
    wherein the encoded output of a last layer of the plurality of layers of the first neural network is the signal encoded image.

5. The method of claim 1, further comprising:
generating the second shared feature of a layer in a plurality of layers in a second neural network, based on the generated statistic feature, the obtained signal encoded image, and a hyper encoding parameter; and
performing convolution to compute the estimated adaptive hyper encoding parameter, based on the generated second shared feature, the generated static feature, and an adaptive signal encoding parameter.

6. The method of claim 5, wherein the estimated adaptive hyper encoding parameter is updated in the plurality of layers of the second neural network.

7. The method of claim 5, further comprising generating an hyper output of the layer in the plurality of layers of the second neural network, based on the generated second shared feature and the estimated adaptive hyper encoding parameter,
wherein the hyper output of a last layer of the plurality of layers of the second neural network is the hyper feature.

8. The method of claim 1, further comprising:
computing the third shared feature of a layer in a plurality of layers in a third neural network, based on the compressed hyper feature and a shared hyper decoding parameter; and
performing convolution to compute the estimated adaptive hyper decoding parameter, based on the third generated shared feature, the recovered statistic feature, and an adaptive hyper decoding parameter.

9. The method of claim 8, wherein the estimated adaptive hyper decoding parameter is updated in the plurality of layers of the third neural network.

10. The method of claim 8, further comprising computing a hyper prior output of the layer in the plurality of layers of the third neural network, based on the third generated shared feature and the estimated adaptive hyper decoding parameter,
wherein the hyper prior output of a last layer of the plurality of layers of the third neural network is the hyper prior feature.

11. The method of claim 1, further comprising:
generating the fourth shared feature of a layer in a plurality of layers in a fourth neural network, based on the hyper prior feature, the recovered signal encoded image, and a shared signal decoding parameter;
performing convolution to compute the estimated adaptive signal decoding parameter, based on the generated fourth shared feature, the recovered statistic feature, and an adaptive hyper decoding parameter; and
generating a decoded output of the layer in the plurality of layers of the fourth neural network, the estimated adaptive signal decoding parameter, wherein the decoded output of a last layer of the plurality of layers of the fourth neural network is the reconstructed image.

12. An apparatus for adaptive neural image compression with a hyperprior model by meta-learning, the apparatus comprising:
at least one memory configured to store program code; and
at least one processor configured to read the program code and operate as instructed by the program code, the program code comprising:
statistic feature generating code configured to cause the at least one processor to generate a statistic feature, based on an input image and a hyperparameter;
first shared feature generating code configured to cause the at least one processor to generate a first shared feature;
adaptive encoding code configured to cause the at least one processor to generate an estimated adaptive encoding parameter;
encoding code configured to cause the at least one processor to encode the input image to obtain a signal encoded image, based on the generated first shared feature and the generated estimated adaptive encoding parameter;
second shared feature computing code configured to cause the at least one processor to generate a second shared feature;
adaptive hyper encoding code configured to cause the at least one processor to generate an estimated adaptive hyper encoding parameter;
hyper feature generation code configured to cause the at least one processor to generate a hyper feature, based on the signal encoded image, the generated second shared feature, and the generated estimated adaptive hyper encoding parameter;
compression code configured to cause the at least one processor to compress the obtained signal encoded image, the generated statistic feature, and the generated hyper feature;
decoding code configured to cause the at least one processor to decode the compressed signal encoded image to obtain a recovered image, the compressed statistic feature to obtain a recovered statistic feature, and the compressed hyper feature to obtain a recovered hyper feature;
third shared feature computing code configured to cause the at least one processor to generate a third shared feature;
adaptive hyper decoding code configured to cause the at least one processor to generate an estimated adaptive hyper decoding parameter;
hyper prior feature generation code configured to cause the at least one processor to generate a hyper prior feature, based on the recovered statistic feature, the generated third shared feature, and the generated estimated adaptive hyper decoding parameter; and
reconstruction code configured to cause the at least one processor to compute a reconstructed image, based on the generated hyper prior feature and the obtained recovered image.

13. The apparatus of claim 12, wherein the program code further comprises:
first shared feature generating code configured to cause the at least one processor to generate the first shared feature of a layer in a plurality of layers in a first neural network, based on the generated statistic feature and a shared signal encoding parameter;
adaptive encoding code configured to cause the at least one processor to perform convolution to generate the estimated adaptive encoding parameter, based on the generated first shared feature, the static feature, and an adaptive signal encoding parameter,
wherein the estimated adaptive encoding parameter is updated in the plurality of layers of the first neural network; and
encoding code configured to cause the at least one processor to generate an encoded output of the layer in the plurality of layers of the first neural network, based on the generated first shared feature and the estimated adaptive encoding parameter,
wherein the encoded output of a last layer of the plurality of layers of the first neural network is the signal encoded image.

14. The apparatus of claim 12, further comprising:
second shared feature generating code configured to cause the at least one processor to generate the second shared feature of a layer in a plurality of layers in a second neural network, based on the generated statistic feature, the obtained signal encoded image, and a hyper encoding parameter; and
adaptive hyper encoding code configured to cause the at least one processor to perform convolution to generate the estimated adaptive hyper encoding parameter, based on the generated second shared feature, the generated static feature, and an adaptive signal encoding parameter,
wherein the estimated adaptive hyper encoding parameter is updated in the plurality of layers of the second neural network; and
hyper feature generation code configured to cause the at least one processor to generate a hyper output of the layer in the plurality of layers of the second neural network, based on the generated second shared feature and the estimated adaptive hyper encoding parameter,
wherein the hyper output of a last layer of the plurality of layers of the second neural network is the hyper feature.

15. The apparatus of claim 12, wherein the program code further comprises:
third shared feature generating code configured to cause the at least one processor to generate the third shared feature of a layer in a plurality of layers in a third neural network, based on the compressed hyper feature and a shared hyper decoding parameter; and
adaptive hyper decoding code configured to cause the at least one processor to perform convolution to generate the estimated adaptive hyper decoding parameter, based on the third generated shared feature, the recovered statistic feature, and an adaptive hyper decoding parameter,
wherein the estimated adaptive hyper decoding parameter is updated in the plurality of layers of the third neural network; and
hyper prior feature generation code configured to cause the at least one processor to generate a hyper prior output of the layer in the plurality of layers of the third neural network, based on the third generated shared feature and the estimated adaptive hyper decoding parameter,
wherein the hyper prior output of a last layer of the plurality of layers of the third neural network is the hyper prior feature.

16. A non-transitory computer-readable medium storing instructions that, when executed by at least one processor for adaptive neural image compression with a hyperprior model by meta-learning, cause the at least one processor to:
generate a statistic feature, based on an input image and a hyperparameter;
generate a first shared feature;
generate an estimated adaptive encoding parameter;
encode the input image to obtain a signal encoded image, based on the generated first shared feature and the generated estimated adaptive encoding parameter;
generate a second shared feature;
generate an estimated adaptive hyper encoding parameter;
generate a hyper feature, based on the obtained signal encoded image, the generated second shared feature, and the generated estimated adaptive hyper encoding parameter;
compress the obtained signal encoded image, the generated statistic feature, the generated hyper feature;
decode the compressed signal encoded image to obtain a recovered image, the compressed statistic feature to obtain a recovered statistic feature, and the compressed hyper feature to obtain a recovered hyper feature;
generate a third shared feature;
generate an estimated adaptive hyper decoding parameter;
generate a hyper prior feature, based on the recovered statistic feature, the generated third shared feature, and the generated estimated adaptive hyper decoding parameter; and
generate a reconstructed image, based on the generated hyper prior feature and the recovered image.

17. The non-transitory computer-readable medium of claim 16, wherein the instructions, when executed by the at least one processor, further cause the at least one processor to:
generate the first shared feature of a layer in a plurality of layers in a first neural network, based on the generated statistic feature and a shared signal encoding parameter; and
perform convolution to compute the estimated adaptive encoding parameter, based on the generated first shared feature, the static feature, and an adaptive signal encoding parameter,
wherein the estimated adaptive encoding parameter is updated in the plurality of layers of the first neural network; and
generate an encoded output of the layer in the plurality of layers of the first neural network, based on the generated first shared feature and the estimated adaptive encoding parameter,
wherein the encoded output of a last layer of the plurality of layers of the first neural network is the signal encoded image.

18. The non-transitory computer-readable medium of claim 16, wherein the instructions, when executed by the at least one processor, further cause the at least one processor to:
generate the second shared feature of a layer in a plurality of layers in a second neural network, based on the generated statistic feature, the obtained signal encoded image, and a hyper encoding parameter; and
perform convolution to compute the estimated adaptive hyper encoding parameter, based on the generated second shared feature, the generated static feature, and an adaptive signal encoding parameter,
wherein the estimated adaptive hyper encoding parameter is updated in the plurality of layers of the second neural network; and
generate a hyper output of the layer in the plurality of layers of the second neural network, based on the generated second shared feature and the estimated adaptive hyper encoding parameter,
wherein the hyper output of a last layer of the plurality of layers of the second neural network is the hyper feature.

19. The non-transitory computer-readable medium of claim 16, wherein the instructions, when executed by the at least one processor, further cause the at least one processor to:
generate the third shared feature of a layer in a plurality of layers in a third neural network, based on the compressed hyper feature and a shared hyper decoding parameter; and
perform convolution to compute the estimated adaptive hyper decoding parameter, based on the third generated shared feature, the recovered statistic feature, and an adaptive hyper decoding parameter, wherein the estimated adaptive hyper decoding parameter is updated in the plurality of layers of the third neural network; and generate a hyper prior output of the layer in the plurality of layers of the third neural network, based on the third generated shared feature and the estimated adaptive hyper decoding parameter, wherein the hyper prior output of a last layer of the plurality of layers of the third neural network is the hyper prior feature.

\* \* \* \* \*